United States Patent
De Ruijter et al.

(10) Patent No.: US 7,190,933 B2
(45) Date of Patent: Mar. 13, 2007

(54) METHOD AND APPARATUS FOR AUTOMATIC TUNING OF A RESONANT LOOP ANTENNA IN A TRANSCEIVER CIRCUIT

(75) Inventors: Hendricus De Ruijter, Sunnyvale, CA (US); Gábor Tóth, Budapest (HU); Péter Onódy, Budapest (HU); András Hegyi, Székesfehérvár (HU); Attila Zólomy, Budapest (HU); Matthijs D. Pardoen, Helystad (NL); János Erdélyi, Dunakeszi (HU); Ferenc Mernyei, Budapest (HU)

(73) Assignee: Intergration Associates Inc., Mountain View, CA (US)

( * ) Notice: Subject to any disclaimer, the term of this patent is extended or adjusted under 35 U.S.C. 154(b) by 316 days.

(21) Appl. No.: 10/891,708

(22) Filed: Jul. 15, 2004

(65) Prior Publication Data

US 2005/0003771 A1    Jan. 6, 2005

Related U.S. Application Data

(63) Continuation-in-part of application No. 10/286,647, filed on Nov. 1, 2002, now Pat. No. 7,058,372.

(51) Int. Cl.
*H01Q 11/12*    (2006.01)

(52) U.S. Cl. ............... 455/125; 455/121; 455/123; 455/119; 333/17.3; 333/124; 343/860; 343/861

(58) Field of Classification Search ............... 455/125, 455/121, 123, 119, 126, 115.1, 114.3, 115.2, 455/116, 113, 114, 575.1, 550.1, 522, 552.1, 455/425, 424, 13.3, 67.11, 63.1, 71, 77, 561, 455/575.7, 95, 129, 64.2, 120, 161.2, 136–139, 455/192.1, 192.2, 192.3, 193.1–193.3, 78, 455/83, 197.2, 197.3, 276.1, 107; 333/17.3, 333/124, 298, 207; 343/860, 861, 858, 852, 343/700; 375/133, 138, 140, 219, 316, 295, 375/296, 285, 346, 304, 315, 297; 330/107, 330/129, 207, 298, 302, 305, 306, 32, 33
See application file for complete search history.

(56) References Cited

U.S. PATENT DOCUMENTS

| 3,794,941 A | * | 2/1974 | Templin ............... 333/17.1 |
| 4,493,112 A | * | 1/1985 | Bruene ................ 455/123 |
| 4,713,808 A | | 12/1987 | Gaskill et al. |
| 5,136,719 A | | 8/1992 | Gaskill et al. |

(Continued)

FOREIGN PATENT DOCUMENTS

WO    WO 88/05213 A1    7/1988

(Continued)

OTHER PUBLICATIONS

Micrel, Inc., MICRF102 QwikRadio UHF ASK Transmitter Preliminary Information, Mar. 2001, 10 pages.

(Continued)

*Primary Examiner*—Edward F. Urban
*Assistant Examiner*—Charles Chow
(74) *Attorney, Agent, or Firm*—Vernon W. Francissen; Francissen Patent Law, P.C.

(57) ABSTRACT

Disclosed is a circuit and method for automatic tuning of a resonant circuit in a transceiver having a receiver and a transmitter that includes a power amplifier for driving the resonant circuit. During a transmit mode of the transceiver, a resonance voltage of the resonant circuit is compared to an input voltage signal to the power amplifier to determine an error signal that is converted into a control word. The control word drives an adjustable capacitance bank that is part of the resonant circuit. During a receive mode of the transceiver, the control word value is held constant to substantially maintain resonance of the resonant circuit during operation of the receiver.

17 Claims, 5 Drawing Sheets

U.S. PATENT DOCUMENTS

| | | | |
|---|---|---|---|
| 5,170,496 A * | 12/1992 | Viereck | 455/121 |
| 5,208,537 A * | 5/1993 | Rietsch et al. | 324/322 |
| 5,301,358 A * | 4/1994 | Gaskill et al. | 455/193.2 |
| 5,404,113 A * | 4/1995 | Nitardy | 330/10 |
| 5,483,680 A * | 1/1996 | Talbot | 455/107 |
| 5,483,688 A | 1/1996 | English et al. | |
| 5,491,715 A * | 2/1996 | Flaxl | 375/344 |
| 5,564,086 A * | 10/1996 | Cygan et al. | 455/126 |
| 5,673,001 A * | 9/1997 | Kim et al. | 330/284 |
| 6,028,503 A * | 2/2000 | Preishuberpflugl et al. | 340/10.4 |
| 6,253,068 B1 | 6/2001 | Elder et al. | |
| 7,058,372 B1* | 6/2006 | Pardoen et al. | 455/125 |
| 2002/0049047 A1 | 4/2002 | Elder et al. | |
| 2003/0119469 A1* | 6/2003 | Karr et al. | 455/307 |

FOREIGN PATENT DOCUMENTS

| | | |
|---|---|---|
| WO | WO 88/05214 A1 | 7/1988 |

OTHER PUBLICATIONS

Micrel, Inc., MICRF103, QwikRadio UHF ASK Transmitter, Final, Jun. 2002, 7 pages.

Micrel, Inc., MICRF104, 1.8, QwikRadio UHF ASK Transmitter, Final Information, Nov. 8, 2001, 10 pages.

Single-chip Transmitter Tunes Its Own Antenna, www.electronicstalk.com, May 7, 2001, 2 pages.

MICRF005/103: QwikRadio 800-1000MHz Tx-Rx Pair Handle 115kbps Data-Rate, www.analogzone.com, Oct. 14, 2002, 2 pages.

Transmitter Keeps in Tune with Loop Antennas, EETimesUK.com, Mar. 30, 2001, 2 pages.

"ASCell3913 868 MHz, 433 MHz and 315 MHz ISM Band FSK Transmitter," *Preliminary Data Sheet*, Rev. No. D5, Austria Micro Systems (Mar. 2002).

"TRF4900 Single-Chip RF Transmitter," *Production Data*, Texas Instruments (Jul. 2000; Revised Jan. 2002).

* cited by examiner

METHOD AND APPARATUS FOR AUTOMATIC TUNING OF A RESONANT LOOP ANTENNA IN A TRANSCEIVER CIRCUIT

CROSS REFERENCE TO RELATED APPLICATIONS

This patent application is a continuation-in-part of commonly assigned, U.S. patent application Ser. No. 10/286,647, filed Nov. 1, 2002 now U.S. Pat. No 7,058,372.

FIELD OF THE INVENTION

The present invention relates to transceiver circuits. More specifically, it relates to automatic tuning of an integrated loop antenna system of a transceiver circuit.

BACKGROUND OF THE INVENTION

A generally license free frequency band called the industrial-scientific-medical (ISM) band has emerged for short range low power applications, such as industrial controls, telemetry and low power data transmission. A range of frequencies from 300 MHz to 1 Ghz is generally provided for ISM. For example, the European ISM standard provides for operation at 433 MHz and at frequencies ranging from 800 MHz to 930 MHz. The US ISM standard provides for a band at 300 MHz and in a range from 902 MHz to 928 MHz. An ISM transceiver may, therefore, need to operate at more than one carrier frequency. The transceiver's carrier frequency $f_c$ is typically determined by a reference frequency fref from a reference crystal. A range of carrier frequency values, e.g. ranging from 800 MHz to 930 MHz, can be achieved by synthesizing the carrier frequency from the reference frequency to obtain the carrier frequency. For example, a phased-lock-loop (PLL) synthesizer may be used to synthesize the carrier frequency from the reference frequency.

Examples of applications for ISM transmitters include: security alarms, telemetry, environment control systems, wireless data repeaters, personal/patient data logging, access and movement monitoring, remote metering, barcode readers, wireless keyboard and mouse, remote keyless entry, remote tire pressure control, garage door openers, and doorbells. Many of these examples may include bi-directional data communication, where a transceiver is useful.

U.S. Pat. No. 6,253,068 issued on Jun. 26, 2001 to Elder et al. discloses an example of a fully integrated all-CMOS AM transmitter with automatic antenna tuning. In the disclosed system, the antenna serves as a resonator for the oscillator block within the phase-lock-loop (PLL). By using the antenna as the resonator, Elder et al. automatically provides that a tuning varactor in the resonant circuitry to receive the proper tuning voltage in order to tune the antenna (VCO resonator) to the desired frequency. However, since continuous tuning is necessary for the PLL, only varactors can be used, which require higher voltage levels that place a relatively high minimum limit on the supply voltage and the signal amplitude on the antenna. Further, any mistuning effects that may occur due to the antenna may cause the oscillator to fall out of the tuning range of the PLL thereby disrupting oscillation and causing the circuit to cease functioning.

U.S. Pat. Nos. 5,136,719 and 5,483,688 describe an approach for antenna tuning that works for small signals that are suitable for use in receiver circuits rather than transmitter circuits. The tuning elements used in these patents are varactors, which require a relatively high minimum supply voltage because a decoupling capacitor is required in order to control the tuning elements.

U.S. Pat. No. 5,136,719 issued on Aug. 4, 1992 to Gaskill et al. discloses another automatic antenna tuning method and apparatus. In Gaskill et al. system, an antenna receives radio frequency signals in a desired reception band from 88 to 108 MHz. The antenna is automatically tuned to receive packets of information on a periodic basis. During a tuning mode, the control circuit sweeps a varactor biasing voltage over its full range to measure an optimum level. To determine the optimum tuning condition, a control circuit receives from a receiver subsystem a Received Signal Strength Indicator (RSSI) signal that is indicative of received signal strength. Once the sweep is concluded, the system sets the tuning element, and hence the antenna, to the value that produced the maximum RSSI signal. A packet of information is then received and passed to a protocol decoder to decode the information. The method of Gaskill et al., however, the antenna tuning approach lacks an adaptive capability with respect to changes in the device environment or in component selection. Further, overall system requirements typically impose certain time limitations on the time available for the antenna tuning procedure, which therefore impose limitations on the accuracy of the antenna tuning procedure as set forth under the Gaskill method.

U.S. Pat. No. 5,483,688 issued on Jan. 9, 1996 to English et al. discloses still another method and apparatus for automatically tuning an adaptive antenna. A predictor value is used to establish an antenna tuning voltage sub-range that is most likely to contain the optimum antenna tuning voltage, where the sub-range is a smaller range than the full antenna tuning voltage range. The antenna tuning voltage sub-range is then traversed while monitoring a signal strength indicator to identify an antenna tuning voltage providing optimum tuning conditions, which improves the execution time and accuracy of the antenna tuning.

Another approach to antenna tuning is found in the ASCell3913 868 MHz, 433 MHz and 315 MHz ISM Band FSK Transmitter from Austria Micro Systems (AMS). (See the ASCell3913 Preliminary Data Sheet, Rev. No. D5, March 2002, incorporated by reference in its entirety.) The ASCell3913 solution uses three capacitance values to tune an antenna. Antenna tuning is allowed for only a short period when the transmitter is powered-up. The resulting state of the tuning circuit is maintained for the duration of the transmission session. This solution has a limited accuracy due to the reduced number of capacitance cells and cannot follow changes in conditions that may occur during long transmission periods.

SUMMARY OF THE INVENTION

The present invention is directed towards to a method and apparatus for tuning an integrated loop antenna tuning system in a transceiver that may operate under low operating voltage supply levels and with a high output signal level.

An embodiment of a transceiver circuit, according to the present invention, has a transmitter circuit, a receiver circuit, and an automatic tuning circuit, where the transmitter circuit includes a power amplifier. In this embodiment, the automatic tuning circuit includes a capacitance bank coupled between the power amplifier and a package connection for connecting to a resonant circuit that includes an antenna. The capacitance bank has an input that is coupled to an output of the power amplifier, an output that is coupled to the resonant circuit, and a control input, where a capacitance of the capacitance bank is determined by a control word received at the control input. The automatic tuning circuit also includes a tuning circuit having a first input for receiving a first voltage present at the inputs of the power amplifier, a second input for receiving a second voltage present across the capacitance bank, a mode input for receiving a mode signal, and an output for generating the control word responsive to the first and second voltages. The tuning circuit is further configured to hold constant the value of the control word responsive to the mode signal, where the mode signal corresponds to a receive mode.

An embodiment of a method, according to the present invention, for automatically tuning a resonant circuit that includes an antenna, the resonant circuit being part of transceiver circuit that includes a receiver circuit and a transmitter circuit that includes a power amplifier for driving the resonant circuit, calls for providing an adjustable capacitance as part of the resonant circuit. The method also calls for comparing a resonance signal of the resonant circuit to an input signal to the power amplifier in order to generate a control word signal for controlling the adjustable capacitance and varying the adjustable capacitance responsive to the control word signal in order to tune the resonant circuit during a transmit mode. Finally, the method sets forth maintaining a constant value for the control word signal responsive to a mode signal corresponding to a receive mode of the transceiver.

BRIEF DESCRIPTION OF DRAWINGS

The present invention is described herein with reference to the accompanying drawings, in which like numerals designate corresponding parts in the figures, wherein.

DETAILED DESCRIPTION OF THE PRESENT INVENTION

The present invention is directed toward a method and apparatus for tuning small resonant loop antennas in transceiver circuits.

To minimize the current consumption, external component count and size of an RF transmitter it is desirable to directly drive an integrated loop antenna having high input impedance. Small loop antennas need tuning capacitance to obtain antenna resonance at a desired operating frequency in order to improve radiation efficiency. The desired resonant frequency for a circuit may be affected by variations in integrated circuit processes, circuit packaging, and PCB manufacturing tolerances.

Figure 1:
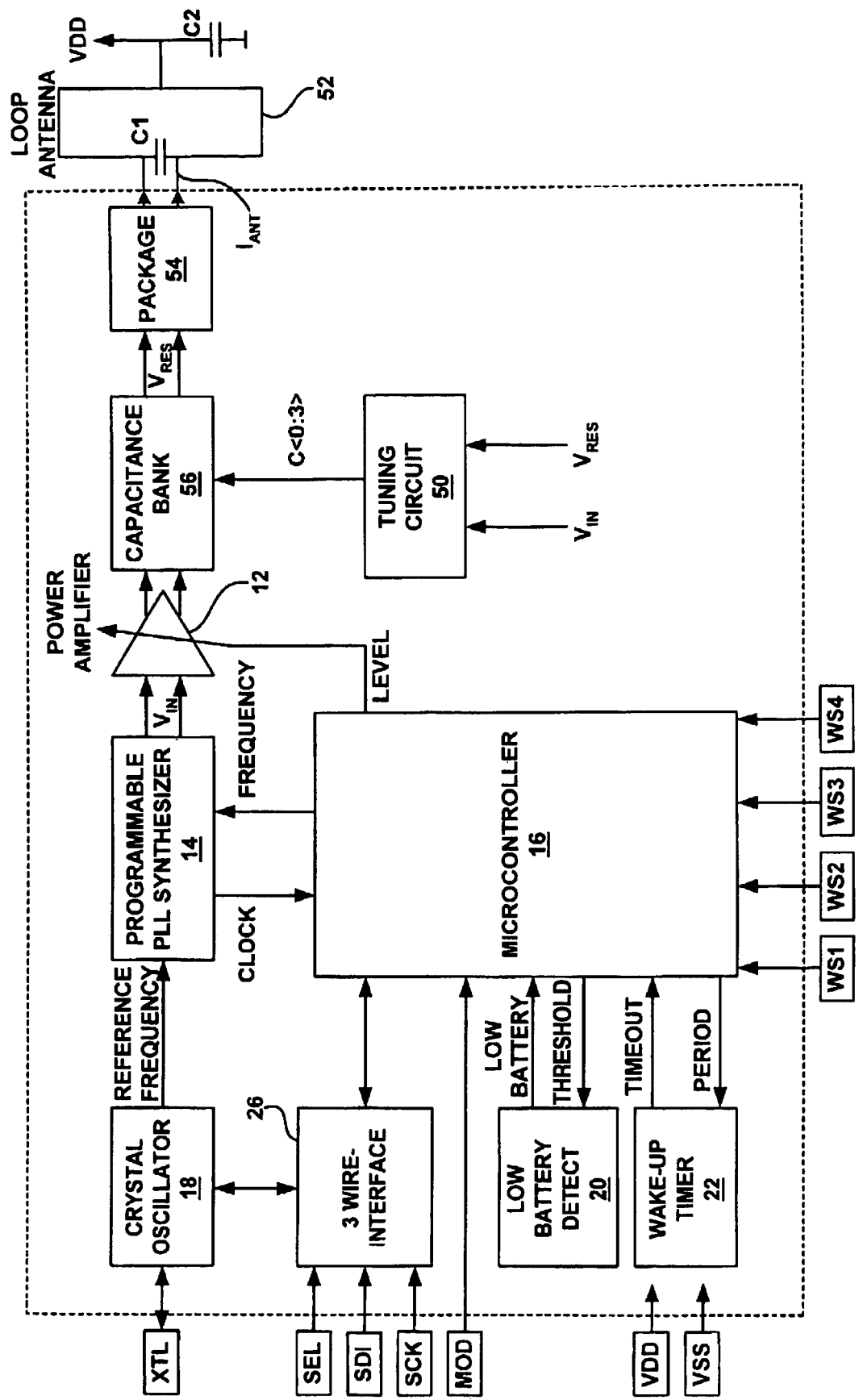
FIG. 1 is a functional block diagram illustrating an example of a low power ISM band Frequency Shift Keying (FSK) transmitter suitable for application of the present invention.

The antenna tuning circuit and method of the present invention identifies a de-tuned condition and acts in order to minimize the detuning. The present invention works on the principle that, when in resonance, the resonant voltage ($V_{res}$) and antenna current ($I_{ant}$) on the complete resonator (antenna, package, plus tuning capacitance) are in phase. If a phase shift is observed, then an error signal (proportional to the phase error) is generated. The error signal is evaluated by a control circuit, which controls the tuning capacitance in response to the error signal. The tuning capacitance is provided by a capacitance bank that operates as a load on the loop antenna FIG. 1 is a functional block diagram illustrating an example of a low power ISM band Frequency Shift Keying (FSK) transmitter 10 suitable for application of the present invention. The transmitter 10 is a direct FSK modulated transmitter designed to comply with the applicable FCC and ETSI standards. The transmitter 10 is configured to support a wide range of operating bands, such as 915 MHz, 868 Mhz, 433 MHz, and 315 MHz. In each frequency band, the transmitter 10 may be programmed digitally. For multichannel or frequency-hopping applications, the frequency of the transmitter 10 may be changed under the control a microcontroller 16, as discussed further below.

In. FIG. 1, the FSK transmitter includes a small loop antenna 52, which is either a closed or open antenna, that is coupled to a package contact 54, such as a pad or pin. The antenna 52 is also coupled a capacitance bank 56 and the antenna 52, package contact 54 and capacitance bank 56 combine to form a complete resonator. A power amplifier 12 of the transmitter 10 has an open-collector differential output to drive the antenna 52 with a programmable output level controlled by microcontroller 16.

A programmable phase-lock-loop (PLL) synthesizer 14 is coupled to power amplifier 12 and determines the carrier frequency of the transmitter. The carrier frequency is synthesized from a reference frequency provided by an on-chip crystal controlled reference oscillator 18. The PLL synthesizer 14 allows the usage of multiple channels in any of the bands. The FSK deviation is selectable to accommodate various bandwidth, data rate and crystal tolerance requirements and it is also high accurate due to the direct close-loop modulation of the PLL 14.

Microcontroller 16 performs the overall control functions associated with the operation of the transmitter 10. Microcontroller 16 receives a series of digital inputs from a three-wire serial interface 26 to allow a user to select, for example, the operating frequency band and the center frequency of the PLL synthesizer 14, the polarity and deviation of the FSK modulation and the output level to drive the small loop antenna 52. In this example, data bits on pin SDI are shifted into the microcontroller upon rising edge of the clock on pin SCK when the chip select pin SEL is low. External capacitor C1 is a fixed capacitance that is part of the resonant circuit and may be selected in order to determine the frequency band of the transmitter. External capacitor C2 is a fixed capacitance that is not part of the resonant circuit and is typically included to ensure an AC ground connection.

In simple applications, the on-chip digital controller allows the transmitter 10 to directly interface a serial electrically erasable programmable read-only memory (EEPROM). The different wake-up events will initiate automatic readout of the assigned command sequence from the memory. All settings and the transmitted code can be programmed without the use of a microcontroller 16.

Figure 2:
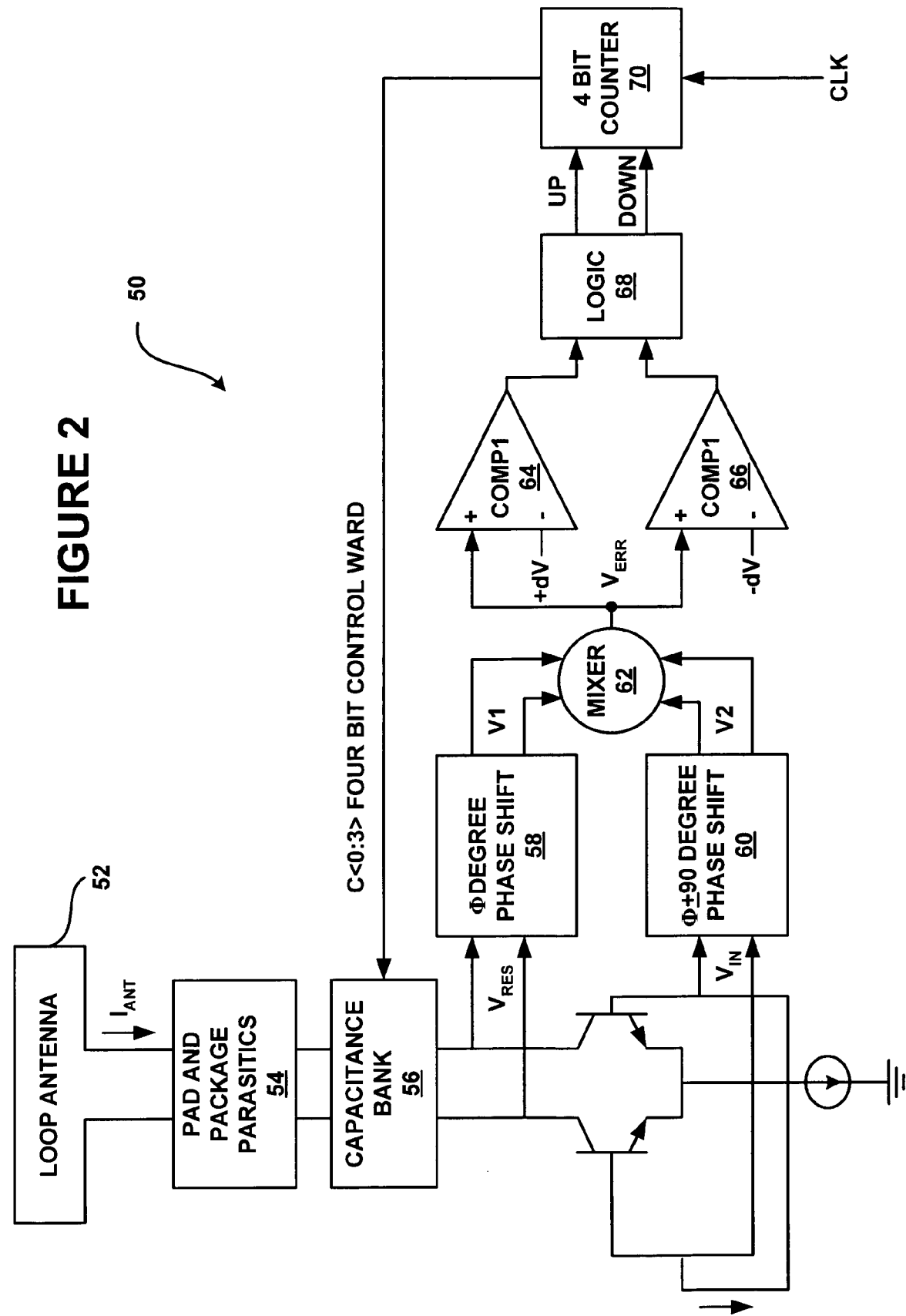
FIG. 2 is a functional block diagram illustrating an embodiment of an antenna tuning circuit according to the present invention.

FIG. 2 is a functional block diagram illustrating an embodiment of an automatic antenna tuning circuit according to the present invention. The tuning circuit 50 controls capacitive bank 56 in response to an input voltage $V_{IN}$ input to power amplifier 12 and the resonant voltage $V_{RES}$ at the input to capacitance bank 56. As noted above, the capacitive bank 56 combines with the loop antenna 52 and the pad and package parasitics 54 to form a resonant circuit.

Tuning circuit 50 includes a pair of phase shifters 58 and 60 and a mixer 62. Phase shifter 58 shifts a phase of the resonant voltage $V_{RES}$ by $\Phi$ degrees to produce voltage signal $V_1$. Likewise, phase shifter 60 shifts a phase of the input voltage $V_{IN}$ by $\Phi-90$ degrees to produce voltage signal $V_2$. $V_1$ and $V_2$ are input to mixer 62 to produce error voltage signal $V_{ERR}$. The error voltage signal $V_{ERR}$ is then input to a compare and control circuit. The compare and control circuitry is configured to generate a control signal that adjusts the capacitance of the capacitive bank based upon the $V_{ERR}$ and $V_{IN}$ signals, thus forming a feedback control loop. In one embodiment, the compare and control logic is composed of comparators 64 and 66, combinational control logic 64, and a 4-bit counter 70.

The use of mixer 62 in the tuning control circuit 50 exploits an inherent property of mixers: if signal with identical frequencies are mixed, then the resulting DC voltage is related to the phase difference of the input signals. The DC output voltage from the mixer, e.g. $V_{ERR}$, is zero if the input signals different by 90 degrees, e.g. in quadrature. The voltage signals $V_1$ and $V_2$ must be placed in quadrature to one another through phase shifting in order to take advantage of this inherent property of mixers. In this embodiment, $V_{IN}$ is phase shifted by $\Phi\pm90$ degrees to produce voltage signal $V_2$ that is in quadrature with $V_1$. As is well understood in the art, other combinations of phase shifts may be used to place $V_1$ and $V_2$ in quadrature with one another. In one embodiment of the present invention, the mixer 62 is realized as a standard Gilbert-Cell.

Since the current in the resonant loop $I_{ANT}$ is in-phase with the input voltage of the power amplifier $V_{IN}$, the phases of $V_{RES}$ and $V_{IN}$ are evaluated. To obtain a zero error voltage $V_{ERR}$ at the mixer output 62 when $V_{RES}$ and $V_{IN}$ are in-phase, a 90 degree relative phase difference must be implemented using phase shifters 58 and 60. This means that $V_1$ and $V_2$ may have a 90 degree phase difference, e.g. a quadrature relationship, when $V_{RES}$ and $V_{IN}$ (i.e. $I_{ANT}$ and $V_{RES}$) are in-phase.

The phase shifters 58 and 60 may be realized as. multi-section R/C and C/R dividers to provide a wide operating frequency range. The $\Phi$-degree phase shifter 58 may be zero degrees. For the protection of circuitry, however, a phase shift of $\Phi=45$ degrees may also be a suitable selection for certain embodiments of the present invention.

The compare and control logic monitors error voltage $V_{ERR}$ and, responsive thereto, increments or decrements counter 70 in order to generate a control word C<0:3> that drives capacitance bank 56. In one embodiment of the invention, two comparators 64 and 66 compare the DC error voltage $V_{ERR}$ from the mixer output 62 to predetermined comparison voltage levels +dV and −dV in order to generate out-of-tune signals that indicate that the resonant circuit is sufficiently out of tune to require correction. The output signals of the comparators determine the state of the UP and DOWN signals generated by the combinational logic circuit 68, as illustrated in the following table:

| $V_{ERR}$ | Comparator 64 | Comparator 66 | UP | DOWN | Counter change |
|---|---|---|---|---|---|
| $V_{ERR} < -dV$ | Low | Low | High | Low | +1 |
| $-dV < V_{ERR} < +dV$ | Low | High | Low | Low | 0 |
| $V_{ERR} > +dV$ | High | High | Low | High | −1 |

If the error voltage $V_{ERR}$ is below −dV, then counter 70 increases the value of the C<0:3> digital control word. If the error voltage $V_{ERR}$ is above +dV, then counter 70 decreases the value of the C<0:3> digital control word. If the error voltage is between the limits of +dV and −dV, then the value of the digital control word will not change. Thus, the counter will never overflow, i.e. if it reaches 15 it will stay there as long as a decrease is not requested. Likewise, if counter 70 reaches 0, then it will stay at that value so long as an increase is not requested.

In the embodiment shown in FIG. 2, a 4-bit counter 70 is utilized as a control word generator to generate a 4-bit digital control word C<0:3>, where counter 70 is running from a divided system clock signal such as 10/8 MHz. The number of bits in the counter and in the control word may be varied to meet the requirements of the particular application or implementation, e.g. an n-bit counter is used to implement an n-bit control word C<0:n−1>. If the error voltage $V_{ERR}$ is within the predetermined range ±dV, then the transmitter circuit is in a "well tuned condition" and the value of the digital control word for the capacitance bank 56 remains stable, e.g. 0. If the error voltage falls below −dV, then the UP signal becomes active and counter 70 increases the value of the digital control word C<0:3> to +1. On the other hand, if the error voltage goes above +dV, then the DOWN signal becomes active and counter 70 decreases the value of the C<0:3> digital control word to −1, e.g. 15. Using a divided system clock signal to drive the counter 70 provides a refractory time period for the transmitter circuit to settle any transients caused by a change in the state of capacitor bank 56 so that the control loop remains stabilized and does not attempt to respond to the transients.

Figure 3A:
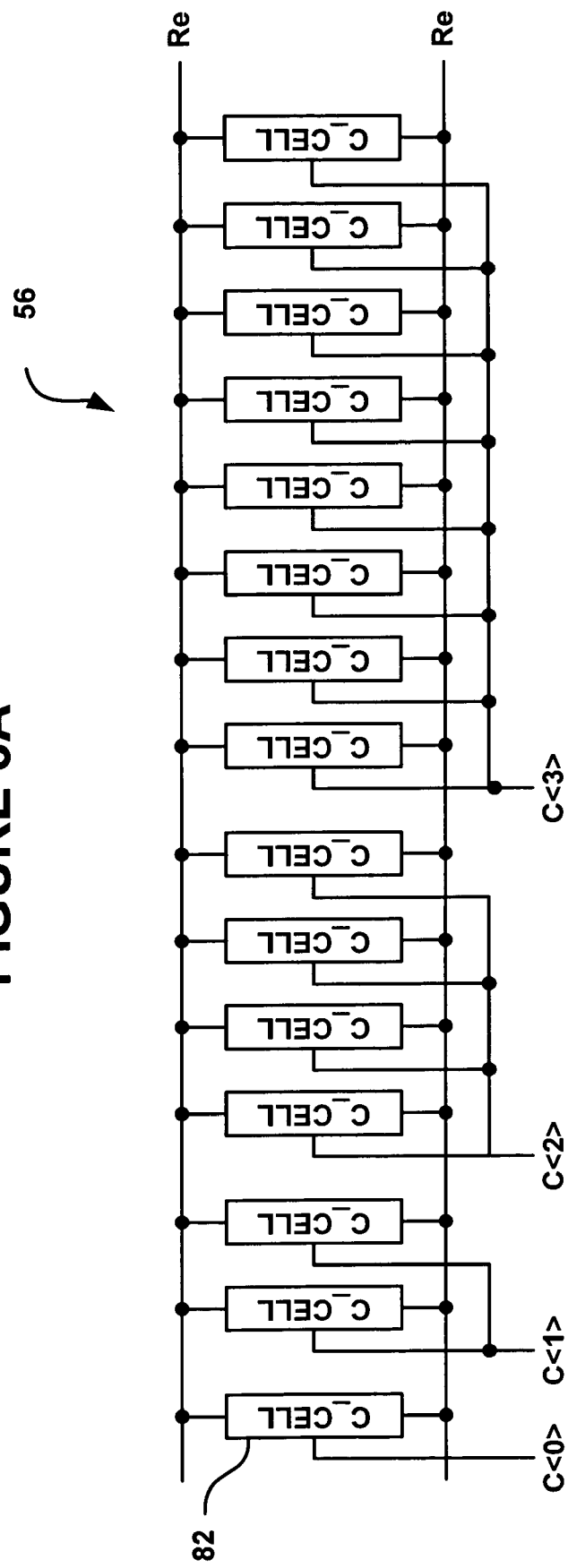
FIG. 3A is a functional block diagram illustrating an embodiment of the capacitance bank of FIG. 2.
Figure 3B:
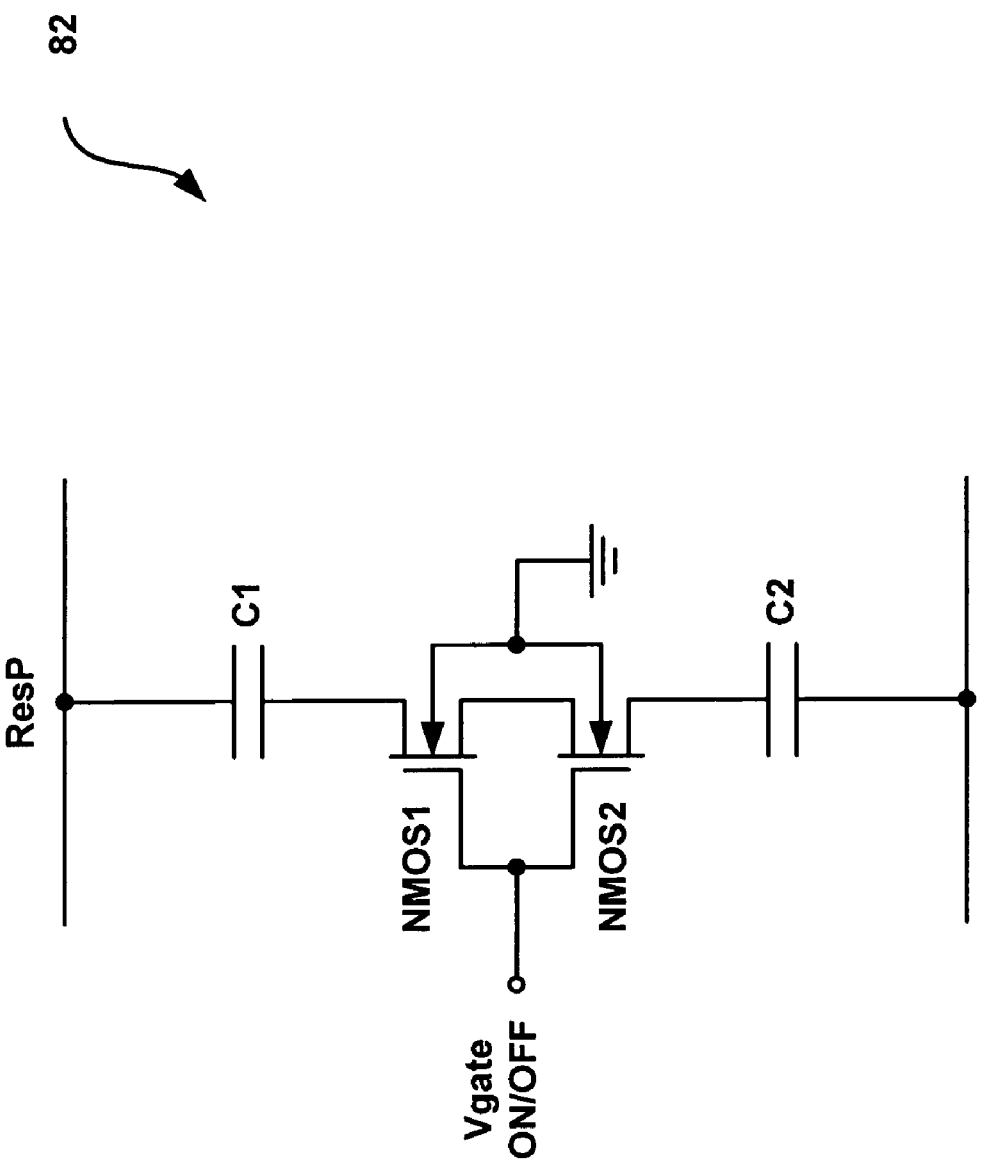
FIG. 3B is a circuit diagram illustrating an embodiment of a capacitance cell of the capacitance bank of FIG. 3A.

FIGS. 3A–B illustrate one embodiment of a capacitance bank 56 and a capacitance cell 82 for use with the present invention. In the embodiment of FIG. 3A, capacitance bank 56 includes groups of capacitance cells, e.g. capacitance cell 82, where the number of cells in each group is determined, in this embodiment, by exponential progression corresponding to the order of the control bit of the control word that drives the group. Thus, in this embodiment, control word bit C<0> drives a single cell, e.g. $2^0=1$. Control word bit C<1> drives two cells, e.g. $2^1=2$. Control word bit C<2> drives four cells, e.g. $2^2=4$. Control word bit C<3> drives eight cells, e.g. $2^3=8$. Other schemes, such as a linear increase obtained using individual capacitance cells and a shift register to generate the control word, may be possible depending upon the requirements of the particular application.

FIG. 3B illustrates an embodiment of a capacitance cell 82 of the capacitance bank 56 of FIG. 3A. Capacitance cell 82 has two capacitances C1 and C2 and switching MOS transistors NMOS1 and NMOS2. The resulting capacitance cell 82 is able to operate at low power supply levels, which may increase the tuning range and increase the amplitude available for the output signal of the transmitter. Because, in the embodiment shown, the power amplifier 12 and the loop antenna 52 are symmetrical circuits, the capacitance cell 82 may be implemented as a symmetrical circuit.

The capacitance cell 82 consists of two states: ON and OFF states. During ON state the cell 82 provides a high capacitance value and may result a low capacitance value while in the OFF state. The OFF state capacitance is determined by the size of the switching MOS transistors NMOS1 and NMOS2. Due to the parasitic drain-bulk and drain-gate capacitances in series with the main capacitors, the OFF state capacitance is obtained. As the MOS transistors NMOS1 and NMOS2 get smaller, then the OFF state capacitance may be smaller and larger ON/OFF capacitance ratio may be obtained. During the ON state, the quality factor of the capacitance cell 82 may be determined by the on resistance of the MOS transistor NMOS1, which is lower with larger devices. The size of the MOS device is therefore selected to keep both the quality factor and the ON/OFF capacitance ratio high.

Instead of the capacitance cell 82, variable capacitors (varactors) may be used. However, varactors may not operate at low power supply levels, which may reduce the tuning voltage of the capacitance bank using varactors. In addition, the use of varactors may also limit the allowed signal amplitude due to the large AC amplitude that may result from a forward biased condition on the DC-wise reverse biased varactors.

The continuous operation and the several states of the capacitance bank 56 allow a fast reaction to any changes during transmission with small steps in the whole resonant system. Having small capacitance steps provided by the capacitance bank 56 the tuning of a resonant circuitry gets even with high quality factor. The number of the necessary ON state capacitance cells is defined by the value of the C<0:n−1> control word, which is updated continuously during transmission in order to minimize the error signal $V_{ERR}$. If the operating frequency changes, or any detuning effect occurs during operation, then the tuning control circuit automatically follows the changes and maintains the resonance of the transmitter at the desired frequency.

Figure 4:
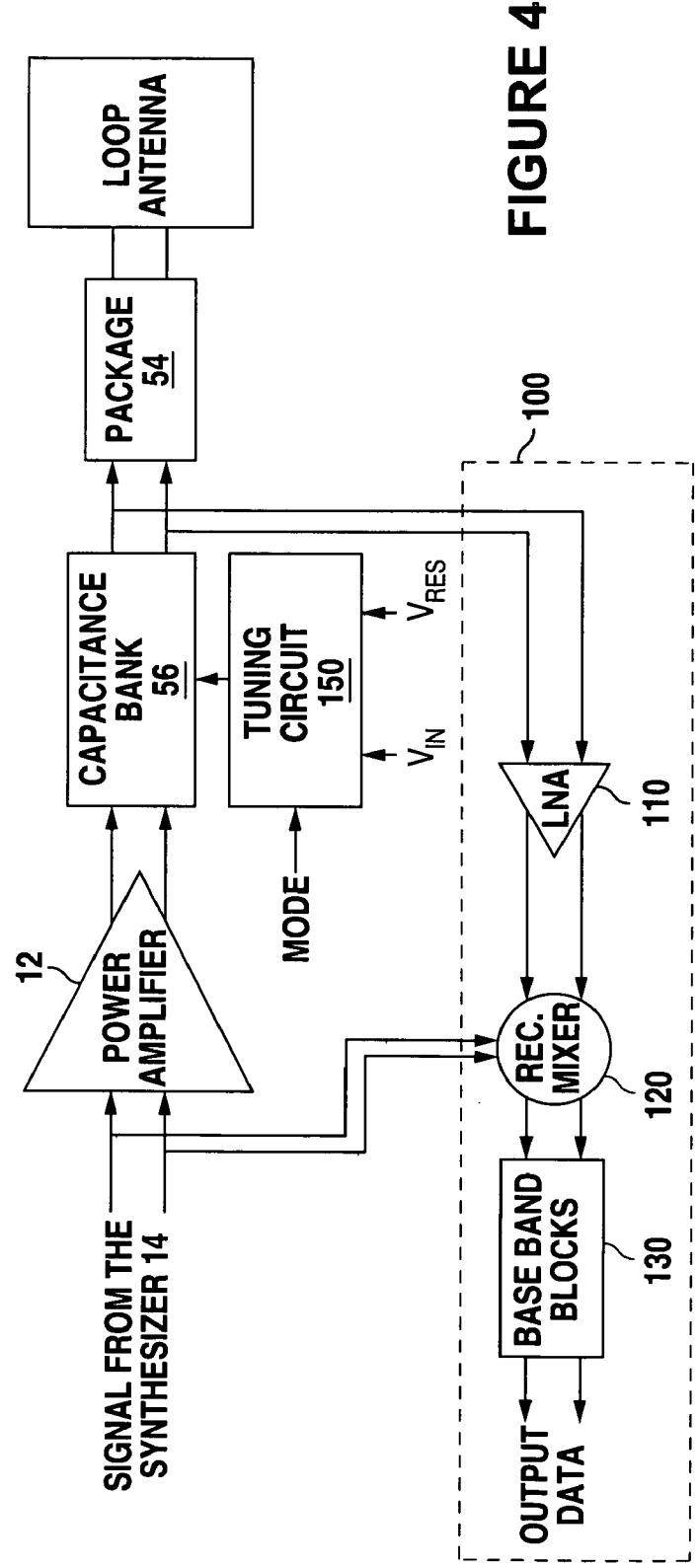
FIG. 4 is a functional block diagram illustrating an embodiment of a receiver portion for a transceiver circuit according to the present invention.

FIG. 4 is a functional block diagram illustrating an embodiment of a receiver portion for a transceiver circuit according to the present invention. The receiver circuit 100 is electrically coupled to loop antenna 52 through the packaging for a transceiver circuit that includes the transmitter discussed above with regard to FIGS. 1–3. In this example, tuning circuit 150 is adapted to hold the control word value C<0:3> that is input to capacitance bank 56 responsive to a MODE signal. Tuning circuit 150 may be adapted in a number of ways to hold the control word value derived during a transmit cycle of the transceiver. For example, the up/down counter 70 of FIG. 2 may be adapted to block the CLK signal or halt the increment/decrement function. By way of another example, a register may be provided that latches the control word value responsive to the MODE signal.

The MODE signal may be generated by internal controller 16 or by an external controller. Also, during a receive mode cycle, power amplifier 12 may be turned off so that no transmit signal is produced by the transmitter circuit, which may also be achieved responsive to the MODE signal. The timing of the MODE signal is such that the control word value C<0:3> derived during the transmit cycle, when a high amplitude signal is present that is suitable for the automatic resonance tuning described above to take place, is captured and maintained during the receive mode to substantially maintain the resonance of the loop antenna.

Further, in the example of FIG. 4, the receiver 100 includes a low noise amplifier (LNA) 110 whose inputs are electrically coupled to the loop antenna. The output of amplifier 110 is input to receiver mixer 120 along with the output signal from synthesizer 14 of FIG. 1. Receive mixer 120 down converts the amplified radio frequency (RF) signal from LNA 110 to a base band frequency using a local oscillator signal that is obtained from synthesizer 14. The down converted signal from mixer 120 is input to base band blocks 130, which decode and recover the received data signal. The received data may be output from the transceiver circuit through interface circuitry for the transceiver similar to the three wire interface shown in FIG. 1.

Figure 5:
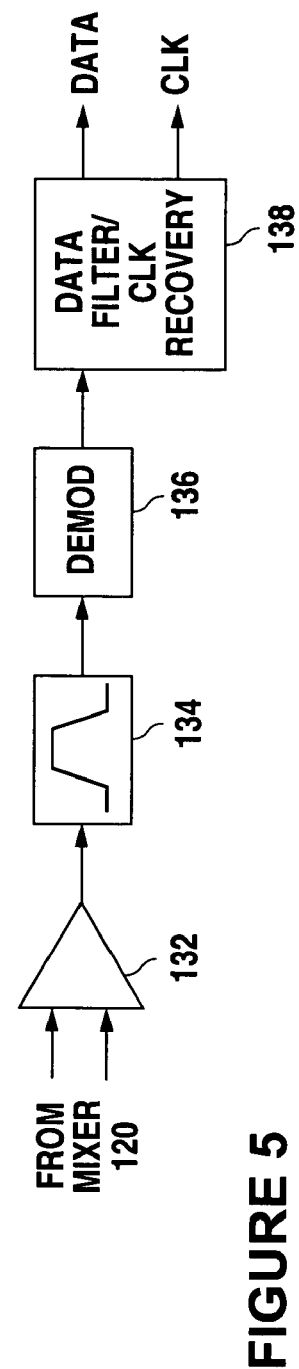
FIG. 5 is a functional block diagram illustrating one example of the receiver base band circuitry of FIG. 4.

FIG. 5 illustrates an example of the base band circuitry 130 for a frequency shift keyed (FSK) receiver. The example of FIG. 5 includes an amplifier 132 that receives the signal output from receive mixer 120, buffers the output from the mixer, and outputs the buffered signal to a filter 134. The filtered signal is output to demodulator 136 and then passes into a data filter and clock recovery circuit 138 to recover the data and clock signals from the received signal. One of ordinary skill in the art will readily appreciate that many different types of receiver circuits may be used depending upon the desired application and that different types of receivers will have different base band circuitry components. The use of different receiver circuits does not depart from this aspect of the present invention, wherein a control value for antenna resonance tuning derived during a transmit cycle of a transceiver is maintained during a receive cycle of the transceiver in order to maintain antenna resonance.

In view of the wide variety of embodiments to which the principles of the present invention can be applied, it should be understood that the illustrated embodiments are exemplary only, and should not be taken as limiting the scope of the present invention. For example, a variety of circuit elements may be utilized to perform certain functions of the present invention. Also, the function of some circuit elements may be combined into a single device while the function of other circuit elements may be implemented so as to be performed by multiple devices. Further, the tuning control circuit and method of the present invention may be applied to a variety of transceiver types where resonance control is advantageous.

We claim:

1. A transceiver circuit having a transmitter circuit, a receiver circuit, and an automatic tuning circuit, where the transmitter circuit includes a power amplifier and where the automatic tuning circuit comprises:

a capacitance bank coupled between the power amplifier and a package connection for connecting to a resonant circuit that includes an antenna, the capacitance bank having an input that is coupled to an output of the power amplifier, an output that is coupled to the resonant circuit, and a control input, where a capacitance of the capacitance bank is determined by a control word received at the control input; and a tuning circuit having a first input for receiving a first voltage present at the inputs of the power amplifier, a second input for receiving a second voltage present across the capacitance bank, a mode input for receiving a mode signal, and an output for generating the control word responsive to the first and second voltages, where the tuning circuit is further configured to hold constant the value of the control word responsive to the mode signal, where the mode signal corresponds to a receive mode.

2. The circuit of claim 1, where the tuning circuit further comprises:
  a first phase shifter having an input coupled to the input of the capacitance bank, where the first phase shifter is configured to phase shift a resonance signal received at the input of the first phase shifter by a predetermined phase shift amount ($\Phi$) in order to generate a first phase shifted signal at an output of the first phase shifter;
  a second phase shifter having an input coupled to the input of the power amplifier, where the second phase shifter is configured to phase shift an input signal received at the input of the second phase shifter by the predetermined phase shift amount ($\Phi$) plus or minus ninety degrees ($\Phi \pm 90$) in order to generate a second phase shifted signal at an output of the second phase shifter that is substantially in quadrature with the first phase shifted signal;
  a mixer having a first input coupled to the output of the first phase shifter, a second input coupled to the output of the second phase shifter, and an output, where the mixer is configured to mix the first phase shifted signal and the second phase shifted signal in order to generate an error signal at an output of the mixer;
  a control word generator having a first and second inputs and an output coupled to the control input of the capacitance bank, where the control word generator is configured to generate the control word at the output of the control word generator responsive to a control signal received at the first input of the control word generator and maintain the value of the control word at the output of the control word generator responsive to a mode signal received at the second input of the control word generator; and
  a compare and control circuit having an input coupled to the output of the mixer, where the compare and control circuit is configured to generate a control signal at an output of the compare and control circuit responsive to the error signal, where the control signal is configured to drive the first input of the control word generator in order to adjust the control word.

3. The circuit of claim 2, where the compare and control circuit comprises:
  a first comparator having a first input coupled to the output of the mixer, a second input for receiving a first comparison voltage signal, and an output;
  a second comparator having a first input coupled to the output of the mixer, a second input for receiving a second comparison voltage signal, and an output; and
  combinational logic circuitry having a first input coupled to the output of the first comparator and a second input coupled to the output of the second comparator, where the combinational logic circuitry is configured to generate an UP signal of the control signal at a first output and a DOWN signal of the control signal at a second output responsive to the signals output from the first and second comparators;
  and where the control word generator comprises a counter having a first input coupled to the first output of the combinational logic circuitry, a second input coupled to the second output of the combinational logic circuitry, a mode input for receiving the mode signal, and a clock input for receiving a clock signal, where the counter is configured to increase a value of the control word responsive to the UP signal and the clock signal, decrease the value of the control word responsive to the DOWN signal and the clock signal, and maintain the value of the control word responsive to the mode signal.

4. The continuous automatic tuning circuit of claim 1, where the capacitance bank comprises a plurality of capacitance cells, where the capacitance cells are grouped into sets of cells separately controlled by each bit of the control word, where a number of cells in each set of cells corresponds to a magnitude of the corresponding bit of the control word within the control word.

5. The continuous automatic tuning circuit of claim 4, where the power amplifier has a differential output pair and where each capacitance cell comprises:
  a pair of transistors coupled in series with one another, where a control terminal of each of the transistors is driven by the corresponding bit of the control word for the cell;
  a first capacitor coupled between a first one of the differential output pair and the pair of transistors; and
  a second capacitor coupled between a second one of the differential output pair and the pair of transistors.

6. A method for automatically tuning a resonant circuit that includes an antenna, the resonant circuit being part of transceiver circuit that includes a receiver circuit and a transmitter circuit that includes a power amplifier for driving the resonant circuit, the method comprising the steps of:
  providing an adjustable capacitance as part of the resonant circuit;
  comparing a resonance signal of the resonant circuit to an input signal to the power amplifier in order to generate a control word signal for controlling the adjustable capacitance;
  varying the adjustable capacitance responsive to the control word signal in order to tune the resonant circuit during a transmit mode; and
  maintaining a constant value for the control word signal responsive to a mode signal corresponding to a receive mode of the transceiver.

7. The method of claim 6, where the step of comparing a resonance signal of the resonant circuit to an input signal to the power amplifier in order to generate a control word signal for controlling the adjustable capacitance further comprises:
  phase shifting a resonance signal of the resonant circuit by a predetermined phase shift amount ($\Phi$) in order to generate a first phase shifted signal;
  phase shifting an input signal to the power amplifier by the predetermined phase shift amount plus or minus ninety degrees ($\Phi \pm 90$) in order to generate a second phase shifted signal that is substantially in quadrature with the first phase shifted signal;
  mixing the first and second phase shifted signals to obtain an error signal; and
  converting the error signal into the control word signal.

8. The method of claim 7, where the step of converting the error signal into the control word signal further comprises:
  comparing the error signal to a first comparison signal to generate a first out-of-tune signal;
  comparing the error signal to a second comparison signal to generate a second out-of-tune signal;
  converting the first and second out-of-tune signals into UP and DOWN signals; and
  adjusting a control word responsive to the UP and DOWN signals.

9. The method of claim 8, where the step of varying the adjustable capacitance responsive to the control word signal further comprises activating and deactivating elements of the adjustable capacitance using the control word.

10. The method of claim 9, where the step of activating and deactivating elements of the adjustable capacitance using the control word includes:
grouping elements of the adjustable capacitance in exponentially increasing numbers of elements; and
controlling each group of elements of the adjustable capacitance using a bit of the control word having a magnitude corresponding to the exponential number of elements in the group of elements.

11. The method of claim 10, where the method includes the step of providing active devices in each element of the adjustable capacitance and the step of controlling each group of elements of the adjustable capacitance using a bit of the control word having a magnitude corresponding to the exponential number of elements in the group of elements includes driving a gate of the active devices in each element with the bit of the control word having a magnitude corresponding to the exponential number of elements in the group of elements.

12. A transceiver system, the transceiver system including an automatic tuning circuit for automatically tuning a resonant circuit that includes an antenna, where the transceiver system also includes a receiver and a transmitter having a power amplifier for driving the resonant circuit, the system comprising:
adjustable capacitance means for providing an adjustable capacitance as part of the resonant circuit;
means for comparing a resonance signal of the resonant circuit to an input signal to the power amplifier in order to generate a control word signal for controlling the adjustable capacitance; and
means for varying the adjustable capacitance responsive to the control word signal in order to tune the resonant circuit during a transmit mode and maintaining a constant value for the control word signal responsive to a mode signal corresponding to a receive mode of the transceiver.

13. The system of claim 12, where the means for comparing a resonance signal of the resonant circuit to an input signal to the power amplifier in order to generate a control word signal for controlling the adjustable capacitance further comprises:
means for phase shifting a resonance signal of the resonant circuit by a predetermined phase shift amount ($\Phi$) in order to generate a first phase shifted signal;
means for phase shifting an input signal to the power amplifier by the predetermined phase shift amount plus or minus ninety degrees ($\Phi \pm 90$) in order to generate a second phase shifted signal that is substantially in quadrature with the first phase shifted signal;
means for mixing the first and second phase shifted signals to obtain an error signal; and
means for converting the error signal into the control word signal.

14. The system of claim 13, where the means for converting the error signal into the control word signal further comprises:
means for comparing the error signal to a first comparison signal to generate a first out-of-tune signal;
means for comparing the error signal to a second comparison signal to generate a second out-of-tune signal;
means for converting the first and second out-of-tune signals into UP and DOWN signals; and
means for adjusting a control word responsive to the UP and DOWN signals.

15. The system of claim 14, where the means for varying the adjustable capacitance responsive to the control word signal further comprises means for activating and deactivating elements of the adjustable capacitance using the control word.

16. The system of claim 15, where the means for activating and deactivating elements of the adjustable capacitance using the control word includes:
means for grouping elements of the adjustable capacitance in exponentially increasing numbers of elements; and
means for controlling each group of elements of the adjustable capacitance using a bit of the control word having a magnitude corresponding to the exponential number of elements in the group of elements.

17. The system of claim 16, where the system includes means for providing active devices in each element of the adjustable capacitance and the means for controlling each group of elements of the adjustable capacitance using a bit of the control word having a magnitude corresponding to the exponential number of elements in the group of elements includes means for driving a gate of the active devices in each element with the bit of the control word having a magnitude corresponding to the exponential number of elements in the group of elements.

* * * * *